UNITED STATES PATENT OFFICE.

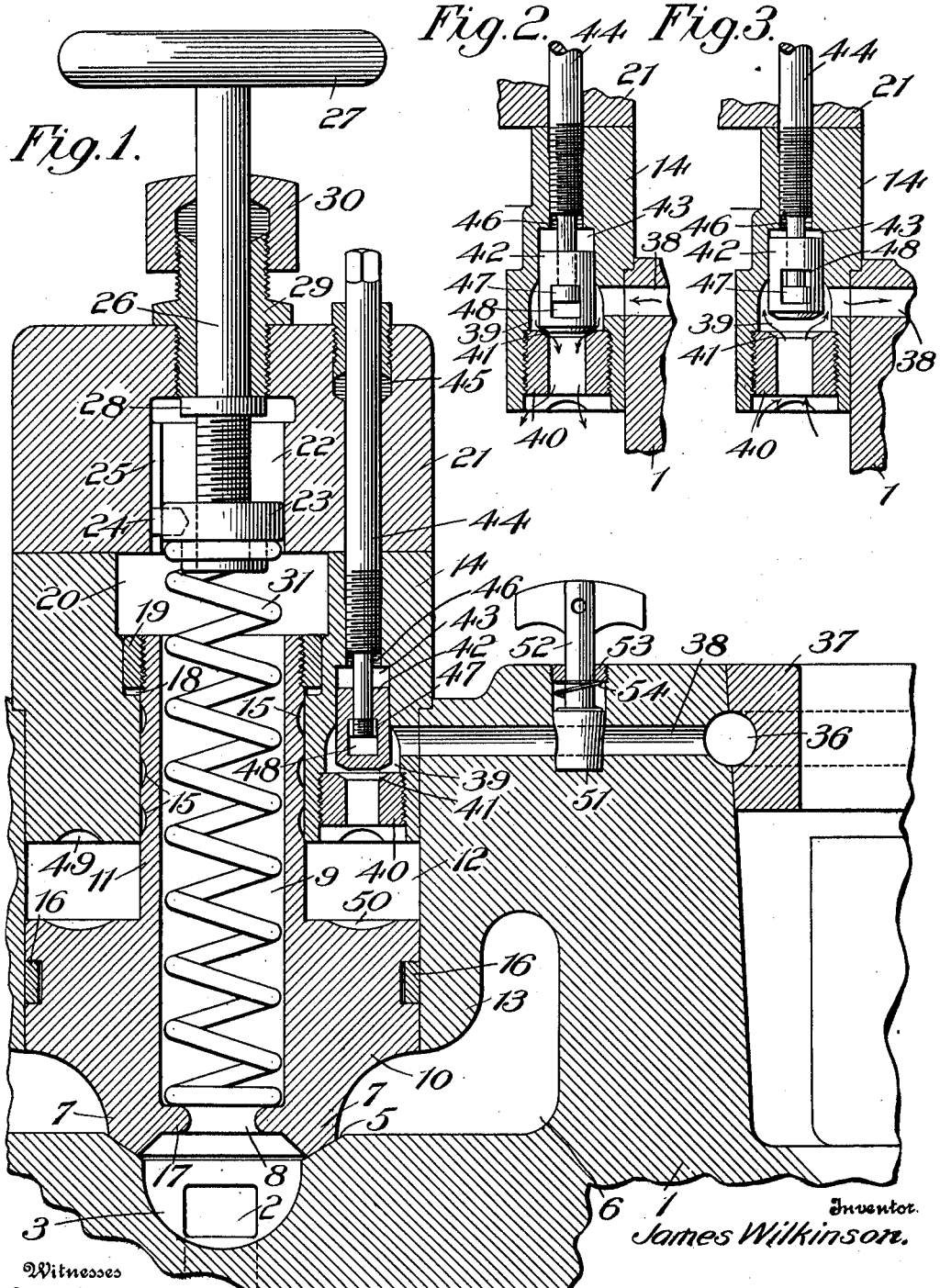

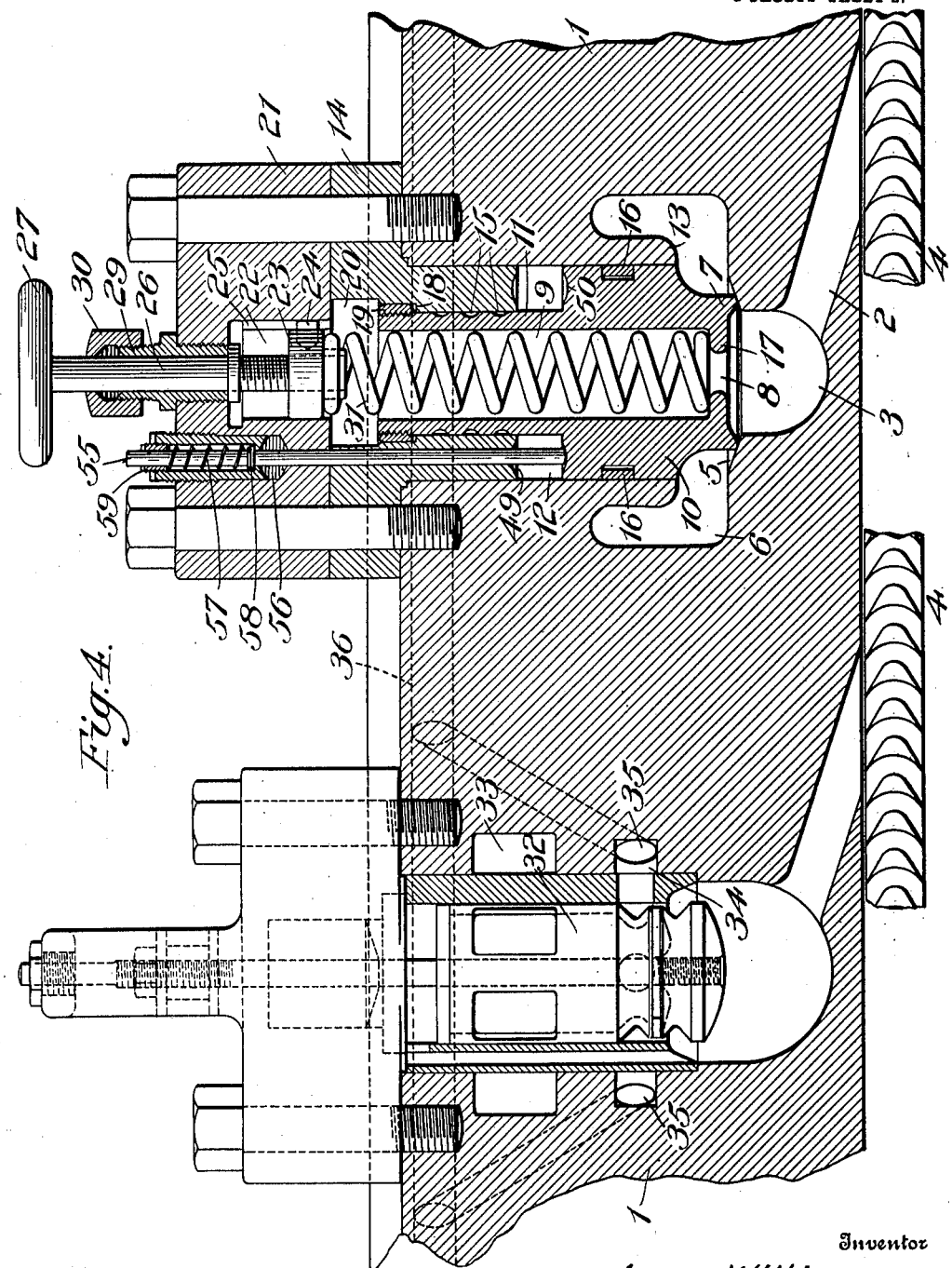

JAMES WILKINSON, OF PROVIDENCE, RHODE ISLAND, ASSIGNOR, BY MESNE ASSIGNMENTS, TO GENERAL ELECTRIC COMPANY, A CORPORATION OF NEW YORK.

TURBINE VALVE MECHANISM.

1,021,224.      Specification of Letters Patent.      Patented Mar. 26, 1912.

Application filed October 19, 1906, Serial No. 339,720. Renewed September 22, 1911. Serial No. 650,982.

*To all whom it may concern:*

Be it known that I, JAMES WILKINSON, a citizen of the United States, residing at Providence, in the county of Providence and State of Rhode Island, have invented certain new and useful Improvements in Turbine Valve Mechanism, of which the following is a specification.

My invention relates to an improvement in fluid pressure operated valves and mechanism for controlling the admission of motor fluid to one or more supply ports or nozzles of an elastic fluid turbine.

My invention is particularly adapted for use in turbines where it is important from a point of efficiency that the valves should operate without intermediate positions. This necessitates the valve moving rapidly from a full open to a full closed position, and, as a consequence, it becomes subjected to different pressures which tend to unbalance it and cause it to hammer its seat. In case the valve is unbalanced, the action of the fluid-pressure against the valve face as it leaves its seat has a tendency to throw the valve open with considerable force, thereby necessitating the use of fluid dashpots and mechanical buffer devices which are undesirable.

It is the purpose of my invention to provide a fluid operated turbine valve element which is simple in design, preferably integral in structure, and which will operate without the use of dash-pots or similar devices, moving rapidly and without hammering to open and close the port under its control.

One of the essential features of my invention is the provision of means to quickly establish and maintain corresponding pressures at both ends of the valve area of the element throughout all of its operating positions, whereby it will respond to a governor after the fashion of a balanced valve. In its simplest form and preferred design, the valve is of the reciprocating puppet type, and the port which admits the pressure existing below the valve to establish itself above the valve or parts movable therewith is preferably formed in and leads through the valve and an annular piston movable therewith. I illustrate the cylinder for the annular piston as exposed below to the fluid supply and above to the controller fluid, suitable packing means being provided to prevent the leakage between the supply, the controller, and the equalizing fluid pressures which act on said valve element simultaneously. To counteract the tendency of the supply pressure to open the valve, I provide a coiled spring which coöperates with the controller fluid in moving and holding the valve to its seat. To assist in holding the valve to its seat so as to prevent leakage, I make the motor differential, using the larger piston area to coöperate with the spring in increasing the pressure with which the valve is held to its seat after closing. By practical tests I find the best results are obtained when the motor differential corresponds to the contact area of the valve on its seat, but I do not specifically limit myself thereto. The valve element is further provided with a dash-pot which acts to produce a momentary cushioning effect adapted to retard the valve's movement at the point of closure.

My invention further consists in the combination with a valve element, such as has been described, of a fluid controller mechanism responsive to changes in the speed of the motor, which moves the valve to regulate the volume of motor fluid flowing through the port under its control. This mechanism comprises, in addition to a primary fluid governing mechanism, a secondary valving means which acts automatically on the controller fluid supply to each valve motor to restrict the inflow of fluid while permitting a more or less free exhaust thereof. The purpose of this is to cause the valve to seat easily, due to the restricted inflow of the fluid pressure, and to open rapidly, thereby minimizing the wiredrawing action of the valve during its travel and preventing it hammering its seat.

My invention also consists in the particular design of the whole valve element and its coöperating cylinder. This is better understood by reference to the accompanying drawings, in which:—

Figure 1 illustrates a vertical section through the supply head of a turbine showing my valve element in section. Figs. 2 and 3 are detail views of the secondary valve in its two operating positions *i. e.*, as the valve's controlling fluid flows into and out of the valve motor cylinder. Fig. 4 is a vertical sectional view taken at right angles to Fig. 1, showing the valve element in combination with an illustrative fluid controller mechanism.

Similar reference numerals refer to similar parts throughout the drawings.

My improvements in the valve element, which term I use broadly to cover the parts connected to the valve, are independent of any particular turbine construction, but are here shown embodied in a turbine of the impact radial flow type having a supply head 1 provided with any desired number of nozzle passages 2 which lead from bowls or enlarged admission ends 3 and are adapted to discharge motor fluid against a bucket wheel 4. The bowls 3 are beveled at their upper ends to form valve seats 5 above which are the supply chambers 6. Fluid-pressure may be supplied in any suitable manner to these chambers, from which it flows, under the control of the valve elements, into the turbine. Each valve element comprises a valve 7 having a narrow annular face which tapers so as to seat flush with the bevel seat 5 of its corresponding bowl 3. The under surface of the valve above the bowl is provided with a port 8 which opens into a chamber 9 in the valve element. This chamber leads through an annular piston 10 and an elongated guide extension 11, both of which parts are preferably formed integral with the valve. The piston is of larger diameter than the valve, the metal tapering gradually from the under face of the piston to the valve face. The exterior diameter of the guide is approximately equal to that of the inner edge of the annular valve face. This, as seen in Fig. 1, leaves the piston with differential areas above and below when closed, the larger area tending to close the valve. The piston moves pressure tight within a cylinder 12 which is bored through the head 1 and a portion 13 which projects into the chamber 6, and is closed at its outer end by a chambered plug 14, which projects well into the cylinder so as to receive the extension 11 and guide and center the valve element to prevent its cocking. The guide 11 makes a steam tight fit in the chamber in the plug, leakage being prevented by the provision of a number of water packing grooves 15 in the guide. A ring 16 or grooves may be used to pack the piston 10. A short cylinder 18 is formed at the outer end of the plug by enlarging the chamber therein. This cylinder receives a ring piston 19 screwed on to the threaded outer end of the guide. Above the cylinder, the chamber in the plug is further enlarged to form the chamber 20 which is in communication with the chamber 9 and is closed by a cap block 21 bolted to the head by cap screws which also pass through flanged portions of the plug 14. The piston 19 will therefore be exposed above to the bowl pressure which will also gain access into the cylinder below the piston, as the piston is designed for a loose fit in its cylinder. The upper end of the guide may be considered as a balancing piston for the valve proper. This cap block is recessed to form a chamber 22 which receives a nut 23 having a tongue 24 working in a slot 25 in the chamber which prevents the nut turning. This nut is provided with a threaded opening for the reception of an adjusting screw 26, which passes outwardly through the top of the block and carries a handle 27. The screw is only threaded throughout a small portion of its length, being provided with a collar 28 disposed at the outer end of the chamber 22 and adapted to engage a threaded nipple 29 which is screwed into the opening in the block through which the adjusting screw was inserted. Above the collar 28 the stem of the screw is plain and works with a close fit in the nipple 29 which is threaded at its outer end for engagement with the packing nut 30. A coiled spring 31 surrounds the lower reduced portion of the nut 23 and passes down through the valve element and engages a shoulder 17 at the inner end of the chamber 9. It tends to close the valve element, and, in coöperation with the fluid pressure above the piston 10, to hold the valve firmly to its seat when closed. By turning the screw 26, the nut 23 may be raised or lowered to adjust the tension of the spring 31 and insure its acting properly in the manner just described.

The governing mechanism for the valves comprises the primary jet controller mechanism which forms the subject matter of my Letters Patent No. 826,000, and which for the purposes of my present invention may be briefly described as comprising a controller nozzle device 32 into which fluid pressure flows from a chamber 33 in the head and is discharged in an annular jet, so as to act with an injector or ejector effect upon the pressure in a chamber 34, from which one or more passages 35 lead to a common controller passage 36 formed by a grooved ring 37, suitably connected to the head 1 which is correspondingly grooved, as seen in Fig. 1. This supply passage 36 leads around the head to points opposite the several valves (only one of which is shown in Fig. 2) connecting with each valve motor cylinder through a passage 38 leading through the head to valve chamber 39 formed in the plug 14. A perforated valve seat 40 is inserted into the lower end of the chamber 39, being screwed into the plug 14. The port in this seat opens below into the cylinder 12 and is beveled outwardly at its upper end to correspond with the beveled face of the adjustable floating check-valve 42. The lower end of this valve enters the valve chamber 39, its upper portion moving in a guide chamber 43 provided therefor in the plug 14. A stem 44 to limit and adjust the oscillatory travel of this valve passes downwardly through a packing gland 45 in the head and is threaded into a threaded opening 46 in the plug 14. Its lower end enters the upper end of the chamber 43 and is reduced and threaded so as to pass freely through an opening in the valve 42 and connect with a nut 47 disposed in a transverse aperture 48 in the valve. This aperture 48 is designed to allow the valve a limited up and down travel, the location of the valve in its lower position relative to the seat 41 being determined by the adjustment of the stem 44. As the controller fluid flows through passage 38 and enters chamber 39, the valve assumes automatically the position seen in Fig. 2, and serves to restrict or throttle the inflow of fluid into the cylinder 12. To cause this fluid to take effect evenly around the piston, I provide the under face of the plug 14 and the upper face of the piston 10 with oppositely disposed annular grooves 49 and 50 which communicate with the port in the seat 41. As the fluid is exhausted from the cylinder, its outflow moves the floating valve to the position seen in Fig. 3, which thus permits a free or restricted exhaust according to the adjustment of the stem 44. As the piston and the plug on each side of these grooves 49 and 50 are faced off so as to make a pressure tight fit when they engage, this construction has the important effect of valving off the suction resulting from the ejector action of the jet nozzle from the packing around both the guide and piston.

To cut a valve out of service or to insure the equal distribution of controller fluid from the passage 36 to the several cylinders, I provide each passage 38 with a throttle valve 51 seated in the head 1 and provided with an operating stem 52 which projects above the head. A screw plug 53 closes the opening through which the valve is inserted and a spring 54 holds the latter to its seat.

I provide an indicating means for the movement of the valve elements comprising a rod 55, which passes through a packing gland 56 threaded into the cap block 21 and through the plug 14 and makes contact with the upper face of the piston 10. A spring 57 engages a collar 58 on the rod and holds it in contact with the piston, a screw nut 59 in the packing gland serving to adjust the tension of the spring and cause the rod to follow the oscillatory movements of the valve.

In operation, assuming that all the valves are to be operated in a group to intermittently cut off the whole supply, the valves 51 will be adjusted to cause an equal flow of the controller fluid between the passage 36 and the several automatic valve chambers 39. When the supply valves are closed, the valves 42 stand in the position shown in Fig. 2. Any suitable speed responsive means may be used to operate the controller jet nozzle 32. When this nozzle ejects the fluid from the passage 36, the valves fly open, as shown in Fig. 3, and permit a more or less free exhaust of fluid from above the pistons 10, whereupon the supply pressure in chambers 6 will overcome the springs 31 and open the valves. As the valves leave their seats, the supply pressure through the ports 8 will immediately establish itself in the chambers 20 so that the valve elements are not further unbalanced by the exposure of the valve faces to the supply pressure. Accordingly the valves, being thus relieved of the tendency of the high pressure acting against their faces as they open to force their pistons hard against the cylinder ends, will move positively and quickly, but without hammering, to their open position. When the governor or speed responsive means moves the jet to divert high pressure fluid into the passage 36 to close the valves, the valves 42 automatically assume the position of Fig. 2 and throttle the inflow of the controller fluid, which, it will be noted, takes effect around the piston 10 by flowing between the grooved surfaces 49 and 50. The valves will move downwardly when the controller pressure in conjunction with the springs 31 becomes superior to the supply pressure in chambers 6. The rapidity of the valves' closing travel is momentarily retarded by the pistons 19, as they act with a dash-pot effect in the cylinders 18. After the valves close, the pressure in the chambers 20 immediately drops with that of the bowl pressure, so that the valve portions proper of the elements remain practically balanced, while the greater piston area exposed above to the controller fluid acts, with the assistance of the springs 31, to hold the valves against their seats with the force necessary to prevent leakage. Obviously the valves 51 may be set to cut any number of the valves out of service.

Broadly considered, my invention consists in the provision of a reciprocatory fluid controlled supply valve adapted to operate without intermediate positions and, by means of a passage opening above and below the valve, to be subjected to equalizing end pressures, the opening and closing movements of the valve being effected by unbalancing its piston by governor controlled means.

I have thus described what I consider the preferred embodiment of my invention, but I desire to protect the same as hereinafter claimed without limitation to the specific details of construction or the several elements which may or may not be used.

What I claim as new and desire to secure by Letters Patent, is:—

1. In an elastic fluid turbine, a reciprocatory supply valve formed as part of a hollow cylindrical shell, an annular piston around said shell, a cylinder for said piston, a passage to equalize the end pressures acting on said shell, and means to admit a governed fluid pressure against said piston responsive to which it moves to fully open or close the valve.

2. In an elastic fluid turbine, a nozzle passage, a reciprocatory puppet valve therefor, a pressure equalizing passage which leads through said valve which is cut off from the high pressure supply when the valve is closed, a spring therein which tends to move said valve to close said nozzle, and speed responsive means to open and close said valve without intermediate operating positions.

3. In a controller mechanism for an elastic fluid turbine, a motor fluid supply port, a reciprocatory valve element, and fluid means to move said elements to fully open and close said port without assuming intermediate operating positions, said element comprising a puppet valve, a piston, and a conduit which opens above and below said valve to substantially equalize the end pressure acting on the valve as it opens and closes and which is cut off from the high pressure when the valve is closed.

4. In a controller mechanism for a turbine, a motor fluid port, a rotatable element acted upon by the motor fluid flowing through said port, a valve controlling the flow of said fluid and adapted to open and close without assuming intermediate operating positions, a fluid motor for said valve which comprises a cylinder, a piston therein connected to said valve, ports through which oppositely acting fluid pressures enter said cylinder, and means to substantially counteract the tendency of the valve to unbalance itself endwise as it opens or closes.

5. In a turbine, a valve chamber, a supply port leading therefrom, a differential cylinder which opens into said chamber above said port, a reciprocatory valve, a valve operating piston which fits pressure tight in the inner enlarged end of said cylinder, a guide carried by said piston and which fits pressure tight in the outer end of said cylinder, governor controlled means to vary the pressure above the piston, a spring tending to close said valve, and a passage to equalize the pressure above the guide and below the valve.

6. In a turbine controller mechanism, a valve chamber, a supply port leading therefrom, a valve for said port, a cylinder exposed to the fluid-pressure in said chamber at one end and to a governed fluid-pressure at the other, a valve operating piston therein, a spring tending to close said valve, means to substantially balance said valve, as it moves to open or close, by a pressure equalizing passage opening above and below it, packing means to prevent leakage of said equalizing fluid-pressure into said cylinder, and controller means which act on said governed pressure to control the operation of said valve.

7. In a turbine, a valve chamber, a nozzle passage leading therefrom, a piston, a cylinder, the inner end of which opens into said chamber at a point above and close to the supply port for said nozzle passage, a valve for said port formed by a short tapering extension of said piston, a head for the other end of said cylinder, means to admit a controller pressure to the outer end of said cylinder, and a spring which tends to close said valve, an equalizing pressure chamber being formed partly in said piston and open to the nozzle pressure through a port in said valve.

8. In a turbine, a chamber formed in a stationary part or parts of the turbine, and a valve and piston element disposed within said chamber and dividing it into three compartments which are respectively exposed to the motor fluid supply pressure, a governed fluid pressure and an equalizing fluid pressure, conduits through which the fluids establishing these pressures enter said compartments, and packing between said element and chamber to prevent leakage between compartments.

9. In a turbine, a supply head therefor comprising a valve chamber open to the supply pressure, a nozzle passage leading from said chamber, a valve for said passage, a piston connected to said valve and carrying a guide extension said piston being interposed between said valve and guide, a cylinder for said piston in the supply head, a detachable element serving as a cylinder head, and a cylinder in said element into which said guide extension fits.

10. In a turbine, a valve chamber, a valve therein, a valve operating means comprising a piston exposed below to the motor fluid in said chamber and above to a variable controller fluid-pressure, and ports which admit said fluid-pressures, said piston being adapted to act as a valve as it moves responsive to a drop in pressure of the controller fluid to cut off leakage from said valve chamber into said controller fluid port, in combination with packing means to prevent the access of high pressure to said valve and a fluid jet controller mechanism to vary said controller pressure.

11. In an elastic fluid turbine, a supply nozzle, an enlarged admission end for said nozzle, a valve seat, a puppet valve adapted to engage said seat and cut off the fluid supply from said nozzle, a valve chamber to which the motor fluid is supplied, a fluid motor for fully opening and closing said valve responsive to a governed fluid pressure, said valve having an end pressure counterbalancing port leading therethrough from its underface where said port will be cut off from the motor fluid supply when said valve is closed, substantially as described.

12. In an elastic fluid turbine, a supply port, a rotary element driven by the fluid flowing therethrough, a valve to close said port, a seat for said valve, and a fluid motor to operate said valve having a piston differential substantially to the extent of the contact area of the valve seat.

13. In an elastic fluid turbine, a reciprocatory supply valve, a seat therefor, and a valve motor in which the piston area for closing the valve exceeds the piston area for opening the valve by an area substantially equal to the contact area of the valve seat.

14. In a turbine, a fluid supply chamber, a cylinder opening into said chamber and a nozzle passage leading therefrom, a valve adapted to engage said seat, a piston which operates said valve and moves in said cylinder, a guide extension carried by said piston which fits pressure tight in a reduced extension of said cylinder, an equalizing passage leading from below said seat to above said guide, means to admit a governed fluid-pressure above the piston, and a spring tending to close the valve, the outer piston surface for closing the valve exceeding the inner substantially by the extent of the contact area of the valve seat.

15. In a turbine, a supply passage, a reciprocatory valve which controls the admission of motor fluid to said passage, controller means to operate said valve without intermediate positions, comprising a cylinder, a piston therein, a guide extension beyond said piston and means to retard the valve's closing movement which comprises a cylinder through which said guide passes, and a piston mounted on said guide which enters the open end of said latter cylinder as the valve closes and is cushioned by the fluid therein.

16. In a turbine controller mechanism, a nozzle, a valve therefor, a valve cushioning cylinder which is formed in a detachable head block for the valve operating motor and which opens at one end into a larger chamber to which the fluid supply has access only when the valve is open, a piston movable with the valve which stands in said chamber when the valve is open and enters said cylinder with a momentary dash-pot effect as the valve moves to close.

17. In a turbine controller mechanism, a nozzle, a valve therefor, a shell movable with said valve, a dash-pot piston carried by said shell, a port opening through the under face of the valve into said shell, a cylinder which receives said piston as the valve closes to retard its closing movement, a fluid motor to open and close said valve, and a spring coöperating with said motor to close the valve.

18. In a fluid controller mechanism for turbines, a passage for the controller fluid, speed responsive means to intermittently admit and exhaust fluid to and from said passage, a plurality of by-passages leading from said passage to valve motors, and valves adapted to be set by hand to equalize the action of the controller fluid in the several motors.

19. In an elastic fluid turbine, a supply valve adapted to operate with intermediate positions, a fluid motor to reciprocate and fully open and close said valve, governor means to admit controller fluid to and exhaust it from a passage leading to said motor, and a floating check-valve acting to throttle the inflow of the controller fluid through said passage leaving the outflow of the fluid unthrottled, as and for the purposes described.

20. In a fluid controller mechanism for elastic fluid turbines, a supply valve, a fluid motor adapted to move said valve from fully opened to fully closed positions without assuming intermediate positions, a fluid controller mechanism comprising a passage leading to said motor, means to intermittently admit the controller fluid to and exhaust it from said passage, a valve chamber in said passage, a valve therein which automatically throttles the inflow of the fluid in one direction only, and means to regulate the extent to which the valve will throttle the fluid.

21. In a controller mechanism for turbines, a supply nozzle, a valve therefor having an elongated shell, two ring pistons around said shell, two cylinders to receive said pistons, means to prevent leakage between said cylinders, a port in the valve opening into said shell through which the fluid flows into the outer cylinder, the outer piston being adapted to fit loosely in its cylinder so as to momentarily cushion itself with the high pressure fluid as it moves with the valve in closing, and fluid controller means acting on the inner piston to operate the valve.

22. In a controller mechanism for turbines, a nozzle passage, a reciprocatory valve therefor, a fluid motor for said valve comprising a differential cylinder and a piston having a valve opening surface exposed to the supply fluid-pressure, a greater valve closing surface exposed to a controller fluid-pressure, and a balancing surface exposed to the fluid-pressure below the valve, a fluid-pressure balancing passage leading through the valve and piston, a spring therein which urges said valve toward its seat, outside means for adjusting the tension of said spring, and controller means responsive to which said valve moves without intermediate operating positions to intermittently cut off the fluid to said nozzle.

23. In a turbine, a piston operated supply valve, a cylinder for said piston formed in the head, a barrel extending above the piston, a closure for said cylinder comprising an inner element having an opening in which said barrel fits pressure tight, and a cap plate, a cylinder formed in said closure, a ring piston connected to the outer end of said barrel and adapted to work loosely in said cylinder, a spring in said barrel which tends to close the valve, means to adjust the tension of said spring, and means to indicate the position of said valve.

24. In an elastic fluid turbine, a piston operated supply valve therefor, a guide extending beyond the piston, means coöperating with said guide to dash-pot the guide's closing movements, and fluid pressure means to control the operation of the valve.

In testimony whereof, I have signed my name to this specification in the presence of two subscribing witnesses, this 12th day of October 1906.

JAMES WILKINSON.

Witnesses:
J. M. Dewberry,
R. D. Johnston, Jr.

Copies of this patent may be obtained for five cents each, by addressing the "Commissioner of Patents, Washington, D. C."